United States Patent
Itte et al.

(10) Patent No.: US 9,684,927 B2
(45) Date of Patent: Jun. 20, 2017

(54) CONSUMER PURCHASE DECISION SCORING TOOL

(71) Applicant: ORACLE INTERNATIONAL CORPORATION, Redwood Shores, CA (US)

(72) Inventors: Wilfred Itte, Cambridge, MA (US); Suneetha Pochiraju, South Grafton, MA (US); Robert Corr, Winchester, MA (US); Dilip Patel, Reading, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 983 days.

(21) Appl. No.: 13/906,412

(22) Filed: May 31, 2013

(65) Prior Publication Data

US 2014/0358731 A1 Dec. 4, 2014

(51) Int. Cl.
*G06Q 30/00* (2012.01)
*G06Q 30/06* (2012.01)

(52) U.S. Cl.
CPC ..... *G06Q 30/0641* (2013.01); *G06Q 30/0619* (2013.01); *G06Q 30/0623* (2013.01); *G06Q 30/0631* (2013.01)

(58) Field of Classification Search
CPC ........... G06Q 30/0601–30/0643; G06Q 30/02; G06Q 30/0201–30/0206; G06Q 30/0251; G06Q 30/0253–30/0254; G06Q 30/0277; G06Q 50/01
See application file for complete search history.

(56) References Cited

U.S. PATENT DOCUMENTS

| | | | | |
|---|---|---|---|---|
| 2002/0004735 | A1* | 1/2002 | Gross | G06Q 30/0214 705/26.41 |
| 2005/0027612 | A1* | 2/2005 | Walker | G06Q 30/02 705/26.7 |
| 2006/0143158 | A1* | 6/2006 | Ruhl | G06F 17/30864 |
| 2007/0288421 | A1* | 12/2007 | Chakrabarti | G06F 17/30964 |
| 2007/0294127 | A1* | 12/2007 | Zivov | G06Q 30/02 705/7.29 |
| 2012/0185476 | A1* | 7/2012 | Ullman | G06Q 30/0625 707/732 |
| 2014/0108135 | A1* | 4/2014 | Osborn | G06Q 30/0271 705/14.49 |
| 2014/0172744 | A1* | 6/2014 | El-Hmayssi | G06Q 30/0282 705/347 |

OTHER PUBLICATIONS

"Viewscore aggregates gadget reviews". TechCrunch. Aug. 30, 2006. Blake Robinson.*
"An aggregate review of aggregate review services". TechCrunch. Sep. 28, 2006.*
www.ViewScore.com. Jun. 10, 2006-Dec. 27, 2008. [recovered from www.archive.org].*

* cited by examiner

*Primary Examiner* — William Allen
(74) *Attorney, Agent, or Firm* — Cooper Legal Group, LLC (57) ABSTRACT

Systems, methods, and other embodiments associated with a consumer purchase decision scoring tool are described. In one embodiment, a method includes receiving a target identifier that identifies a target product. The example method also includes calculating a buy score for the target product.

15 Claims, 10 Drawing Sheets

| Keywords 270 | Weight 280 | Social Contact 1 291 | Social Contact 2 292 | Social Contact 3 293 |
|---|---|---|---|---|
| Price | 40 | 8 | 7 | 7 |
| Reliability | 25 | 7 | 7 | 8 |
| Performance | 25 | 6 | 5 | 6 |
| Design | 10 | 2 | 7 | 3 |

CONSUMER PURCHASE DECISION SCORING TOOL

BACKGROUND

Consumers are increasingly relying on customer reviews to make purchase decisions. A customer review is a review of a product or service made by a customer who has purchased the product or service. Customer reviews are a form of customer feedback on electronic commerce and online shopping websites. There are also dedicated review sites, some of which use customer reviews as well as or instead of professional reviews. These customer reviews are dispersed over numerous online shopping websites and a single product may have thousands of reviews. Users are currently subjected to vast amounts of customer feedback that is widely distributed without a way to distill that customer feedback.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Consumers are increasingly using the internet to make purchase decisions. For example, consumers use price comparison sites, get product recommendations on social media, and consult product reviews. This is time consuming and requires research because consumers are not simply sticking to one website to get their information. Instead, consumers are looking for a target product at multiple retailers and reading product reviews on those retailers' websites. Shopping has also become more social as consumers are able to get recommendations from family members, friends, and even acquaintances. However, all of this raw information can be overwhelming. Ultimately, the consumer wants to distill the raw information down to determine whether or not the consumer should purchase the target product.

Systems and methods are described herein that facilitate consumer purchase decisions by calculating a buy score. The buy score is calculated based on the target product's features, the user's desired attributes, product reviews of other consumers, and feedback from the user's family members, friends, and acquaintances.

Figure 1:
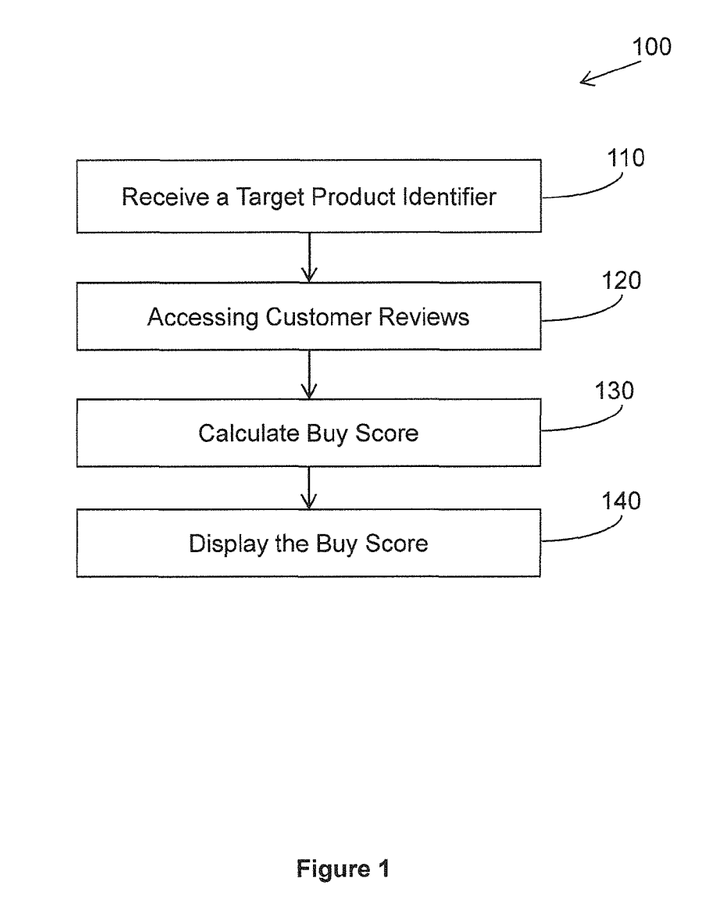
FIG. 1 illustrates one embodiment of a method associated with a consumer purchase decision scoring tool.

With reference to FIG. 1, one embodiment of a method 100 associated with consumer purchase decision scoring tool is illustrated. At 110, a target product identifier is received from the user. The target product identifier identifies a product that the user wishes to research so that the user can determine whether to purchase the target product.

At 120 the method includes accessing customer reviews for the target product. The customer reviews are accessed on one or more retailer websites using an application programming interface (API). Customer reviews for the target product are identified using the target product identifier. The customer reviews contain user feedback from consumers that have purchased or used the target product. The feedback may be in the form of a rating assigned to the product. For example, a product may be assigned a star rating, numerical rating, or graphical representation of a value (e.g., percentage of a bar graph). A customer review may also include a written description, criticism, and/or praise for the target product.

At 130 the method includes calculating the buy score. The buy score is calculated using information from the accessed customer reviews, such as the ratings assigned to the target product. In one example, the customer reviews rate the target product out of five stars and the target product receives 3, 3, 4, 4, and a 5 star rating. These ratings can be standardized to a percentage, specifically, 60%, 60%, 80%, 80%, and 100%. The buy score is averaged from the percentages, and therefore, in this example, the buy score is 76%. At 140, the buy score is displayed for the user.

Calculating the buy score at 130 may also include calculating a comparison metric for an alternative product. The target product identifier and keywords are used to identify alternative products that would also meet the user's needs. Alternative products with websites that also contain the keywords are selected for comparison. Also, the websites' APIs may be used to determine whether alternative products are recommended for users that search the target product identifier. A comparison metric is calculated for the alternative products by calculating a buy score for the alternative product. The buy score for the alternative product may be based on customer reviews and/or survey questions directed to determining if social contacts have used the alternative product.

Figure 2A:
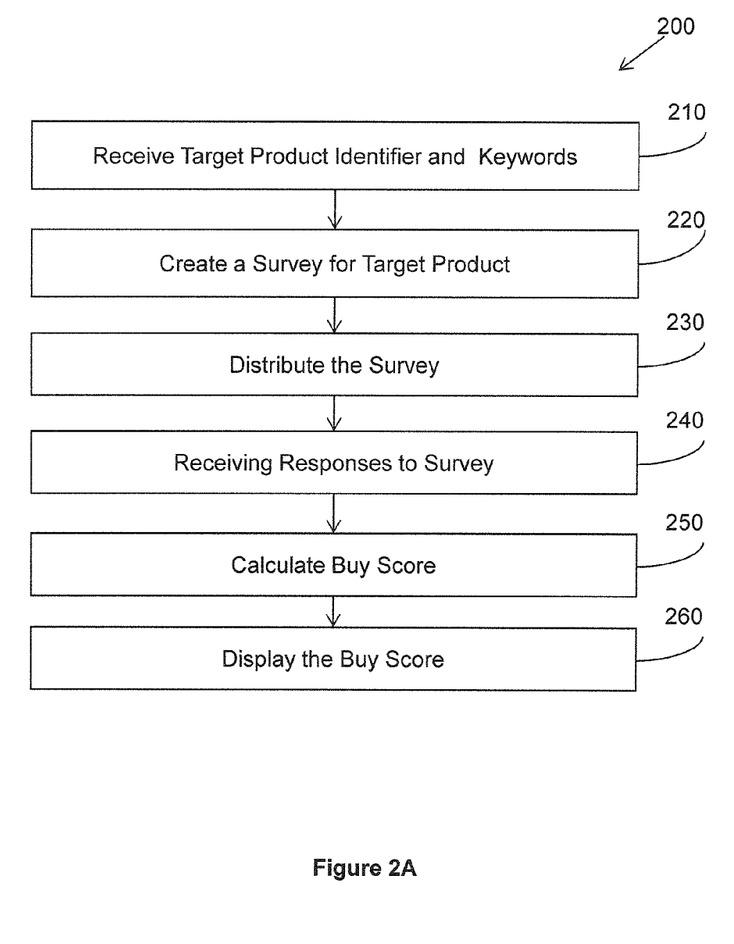
FIG. 2A illustrates another embodiment of a method associated with a consumer purchase decision scoring tool.

FIG. 2A illustrates another embodiment of a method associated with a consumer purchase decision scoring tool. Method 200 includes, at 210, receiving a target product identifier and keywords from a user for a target product. The target product identifier identifies the target product and the keywords identify desired product features or important criteria that the user would like to inquire about. In this manner, the user is able to personalize their requirements for the target product. The keywords may be entered by the user or selected by the user from a menu of features associated with the target product. The menu of features may be generated by accessing retailer websites that sell the target product. The keywords may be weighted in the buy score such that a user is able to rank the features that the user considers to be the most important.

At 220, a survey is created for the target product based on the keywords. The survey may be generated for the user using the keywords that the user has selected. Generated questions can be edited by the user. Alternatively, the user may draft questions for the survey. Questions can be weighted to indicate that the user has a particular interest in receiving a response to the question.

At 230, the survey is distributed to social contacts of the user so that the user can receive feedback from people the user knows. The social contacts of the user may be selected from social networking groups of social networking websites, such as, FACEBOOK®, LINKEDIN®, or MEETUP®. Social contacts may be selected based on their availability online. The user may also add to the list of social contacts with family, friends, and acquaintances by providing contact information, like email addresses. The survey is distributed via the social networking website, email, text message, or alternative computer communication. The survey may expire after a predetermined amount of time. At 240, responses to the survey are received from the social contacts. Responses to the survey that contain answers to weighted questions may be given priority over other responses.

Figure 2B:
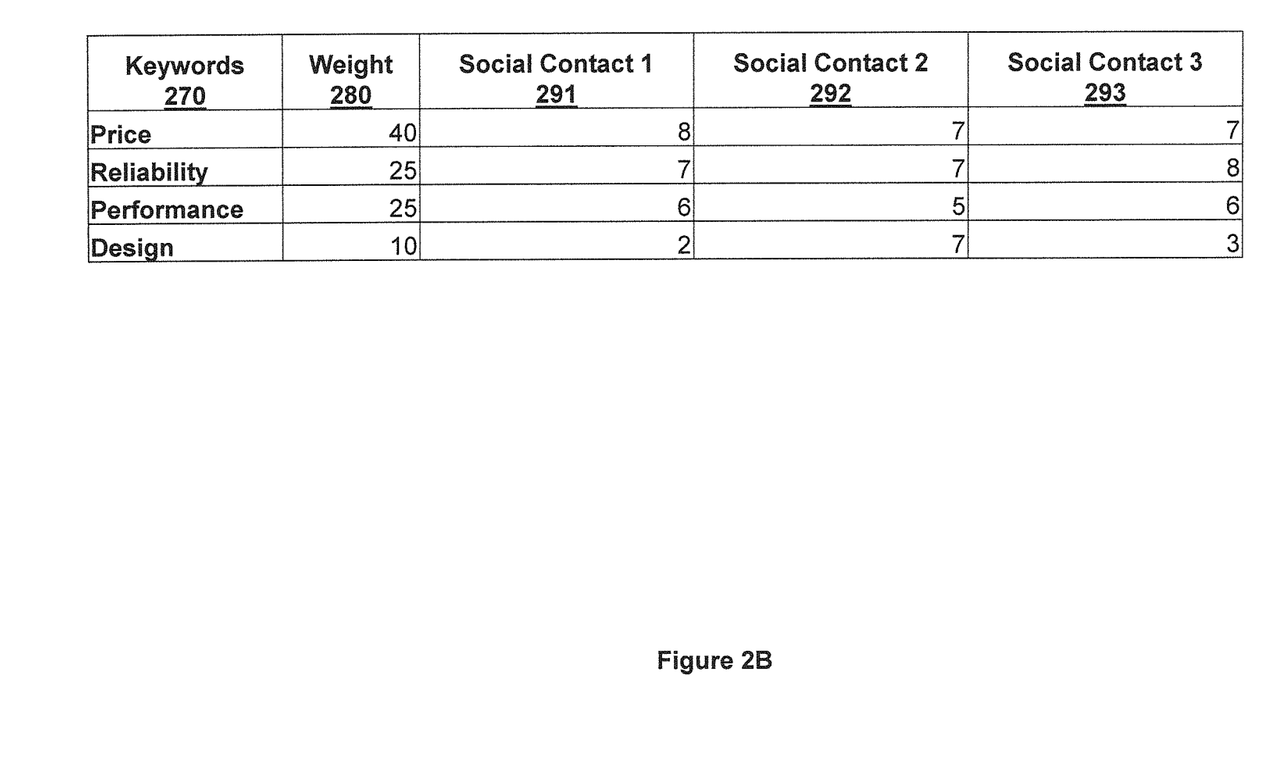
FIG. 2B illustrates an example of summarized responses from social contacts associated with a consumer purchase decision scoring tool.

At 250, the method 200 includes calculating the buy score. Referring to FIG. 2B, an example of summarized responses from social contacts is illustrated. Column 270 illustrates the keywords chosen by the user. In the illustrated example, the user has chosen price, reliability, performance, and design as the criteria that are important to the user. The user has weighted the criteria as illustrated in column 280. Specifically, the keywords have been given a weight as a percentage of 100: price 40%, reliability 25%, performance 25%, and design 10%. The survey in this example, has asked that social contacts respond to these keywords with a score between 1 and 10. For example, social contact 1, in column 291, has scored the target product as: price 8, reliability 7, performance 6, and design 2. Social contact 2, in column 292, has scored the target product as: price 7, reliability 7, performance 5, and design 7. Social contact 3, in column 293, has scored the target product as: price 7, reliability 8, performance 6, and design 3.

The collective score for price from social contact 1, social contact 2, and social contact 3 is 8+7+7=22. Price has been given a weight of 40 by the user. Therefore, the weighted price is 40*22=880. This is performed for each of the keywords based on the scores of the social contacts and the weight assigned to the keyword by the user. The total score is 1975 for the target product out of a possible 3000. Accordingly, returning to FIG. 2A, the buying score is calculated at 250 of method 200 based on the survey of social contacts is 1975 divided by 3000 or 66%.

A user may choose to consider both a buy score based on consumer reviews and a buy score based on the responses of social contacts to a survey. Recall that in FIG. 1, the buy score calculated based on consumer reviews was 76% and the buy score based on reviews from social contacts is 66%, should the user choose to equally weight the two buy scores, the buy score would be averaged from the two or in this example 71%. Alternatively, a user may wish to weight the two buy scores differently. At 260 in method 200, the buy score is displayed for the user.

Figure 3:
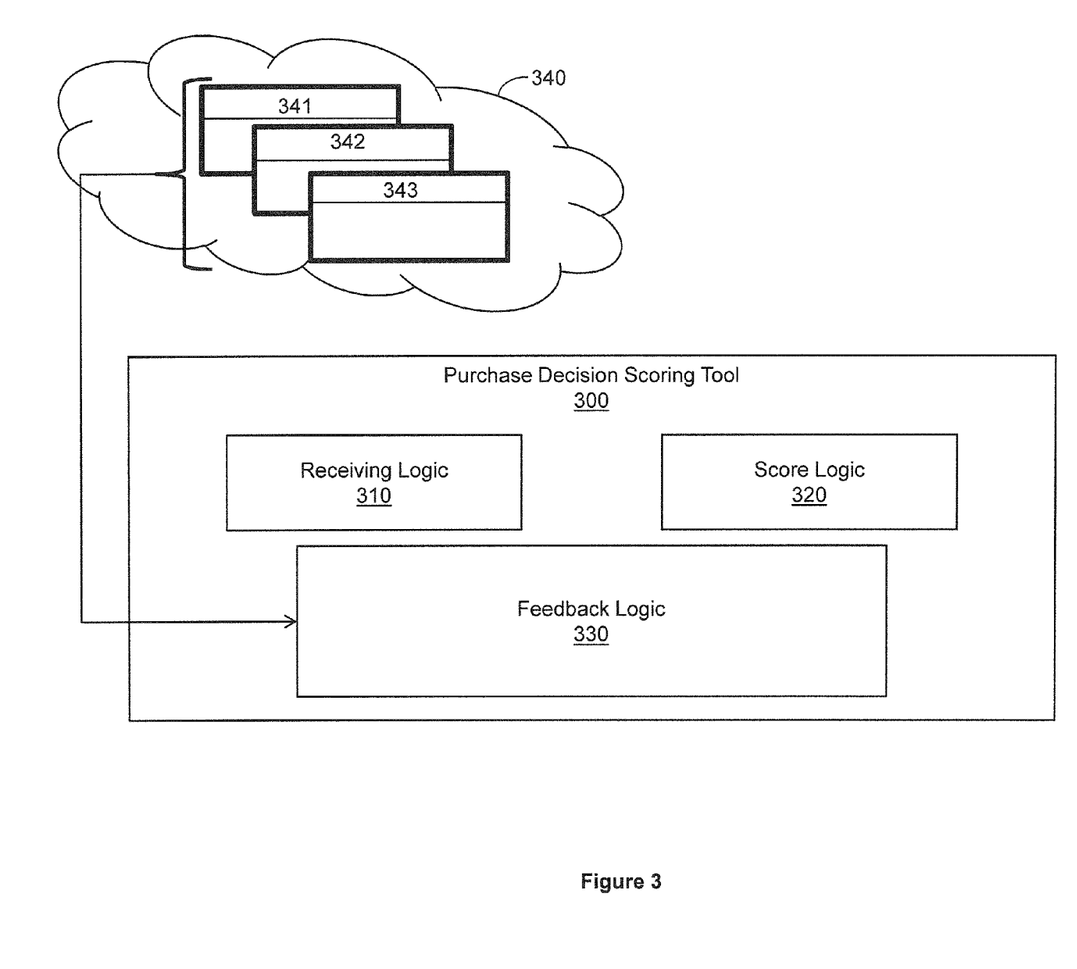
FIG. 3 illustrates one embodiment of a system associated with a consumer purchase decision scoring tool.

FIG. 3 illustrates one embodiment of a purchase decision scoring tool 300 associated with providing a buy score for a target product. The purchase decision scoring tool 300 may be run as software in execution on a computer, an application on a mobile device, or may be launched as an applet from a web page. The purchase decision scoring tool 300 includes a receiving logic 310, a score logic 320, and a feedback logic 330.

The receiving logic 310 receives a target identifier that identifies a target product that the user wishes to research. The receiving logic 310 also receives keywords from the user that identify the product features and other criteria (e.g., price, reliability, availability) that the user has a particular interest in. The score logic 320 calculates a buy score for the target based on information aggregated by the feedback logic 330.

The feedback logic 330 accesses at least one website for feedback data. Specifically, the feedback logic 330 accesses a cloud 340 that hosts a number of resources such as websites 341, 342, and 343 that are accessible over a network. The feedback logic 330 uses the target product identifier and the keywords to determine what content of websites 341, 342, and 343 is relevant and constitutes feedback data for the for the target product. In one example, the websites 341, 342, and 343 are searched for the target identifier. The score logic 320 generates a buy score based, at least in part, on presence of keywords in the websites 341, 342, and 343. In addition to the websites 341, 342, and 343, the feedback logic 330 may access customer reviews and responses to surveys.

Figure 4:
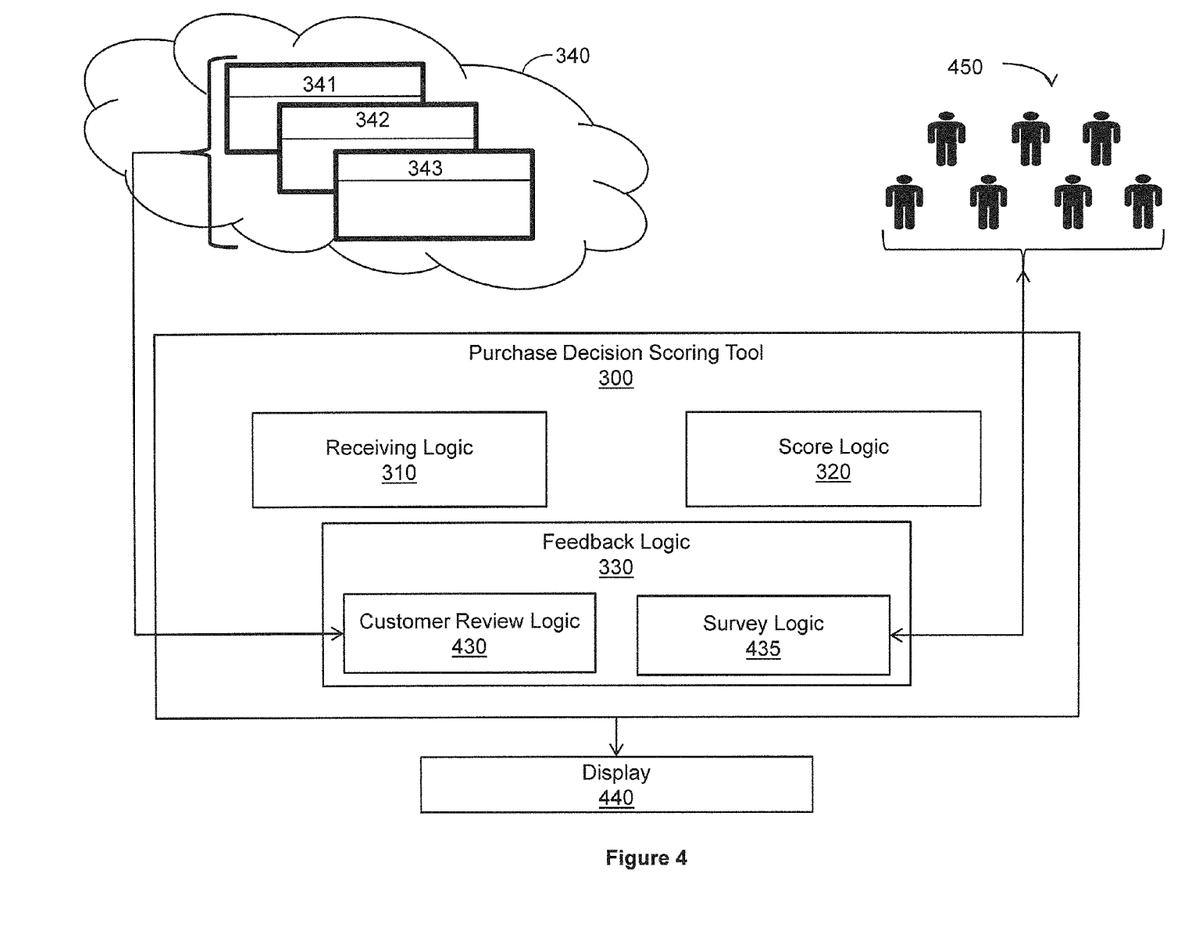
FIG. 4 illustrates an embodiment of a system associated with a consumer purchase decision scoring tool.

FIG. 4 illustrates one embodiment of a purchase decision scoring tool 300 associated with providing a buy score for a target product. The purchase decision scoring tool 300 functions in the manner described with respect to FIG. 3. The purchase decision scoring tool 300 includes the receiving logic 310, the score logic 320, and the feedback logic 330. The feedback logic 330 includes a customer review logic 430 and a survey logic 435.

The customer review logic 430 accesses customer reviews for the target product on the cloud 340. The websites 341, 342, and 343 may be retailers' websites that contain customer reviews for the target product. The customer review logic 430 accesses customer reviews on a retailer website using the website's API. Thus the website's API acts as an interface for the purchase decision calculator and the retailer's website A target product may have hundreds, even thousands, of customer reviews. To identify the more relevant customer reviews, the customer review logic 430 uses keywords, selected by the user, as search terms input to the website's API to identify customer reviews that contain the keywords. The purchase decision scoring tool 300 may discard customer reviews having the target product identifier if the customer review does not also contain at least one keyword. Alternatively, the customer review logic 430 may include all customer reviews but prioritize customer reviews that contain keywords.

The user may also weight the keywords. In one example, a user has selected a specific camera as a target product and keywords, such as, shutter speed and f-stop. The user weights shutter speed more heavily than f-stop. Customer reviews having only the keyword f-stop are prioritized below customer reviews having only the keyword shutter speed. Customer reviews having both keywords may be prioritized the higher that customer reviews that contain only one of the keywords. The priority of customer reviews may also be determined based on the number of times that keywords appear in a customer review.

The survey logic 435 creates a survey about the target product. The survey is distributed to social contacts 450 of the user. The survey logic 435 accesses social networking websites using an API of the social networking website. Social contacts 450 of the user on the social networking website are selected to receive the survey. The survey is generated by the survey logic 435 using the target product identifier and is used to determine whether the user's social contacts 450 have feedback about the target product. The survey may also include the keywords to focus the social contacts' responses on the concerns of the social contacts. The survey logic 435 receives the social contacts' responses.

The score logic 320 calculates the buy score using either the customer reviews processed by the customer review logic 430, the social contacts' responses received by the survey logic 435, or both the customer reviews and the social contacts' responses. Additionally, a user may decide that the user's social contacts' responses should have more weight than customer reviews. In the event that the user selects to weigh social contacts' responses more heavily than customer reviews, the score logic 320 will do so when calculating the buy score.

The purchase decision scoring tool 300 outputs the calculated buy score to a display 440. The customer reviews may also be rendered on a display 440 for the user. The customer reviews are displayed in the prioritized order determined by the customer review logic 430. The prioritized order may be based on keywords input by the user.

Figure 5:
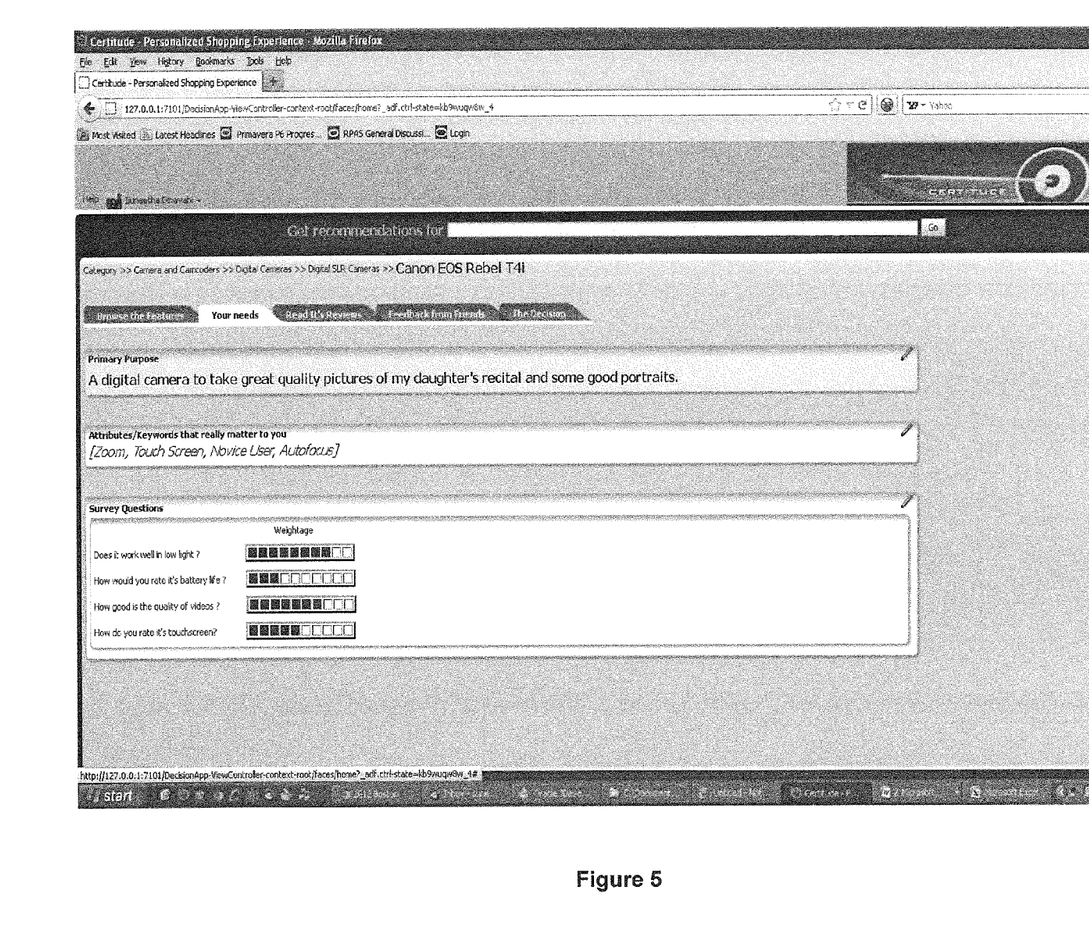
FIG. 5 illustrates example screen shots of one embodiment of a consumer purchase decision scoring tool.
Figure 6:
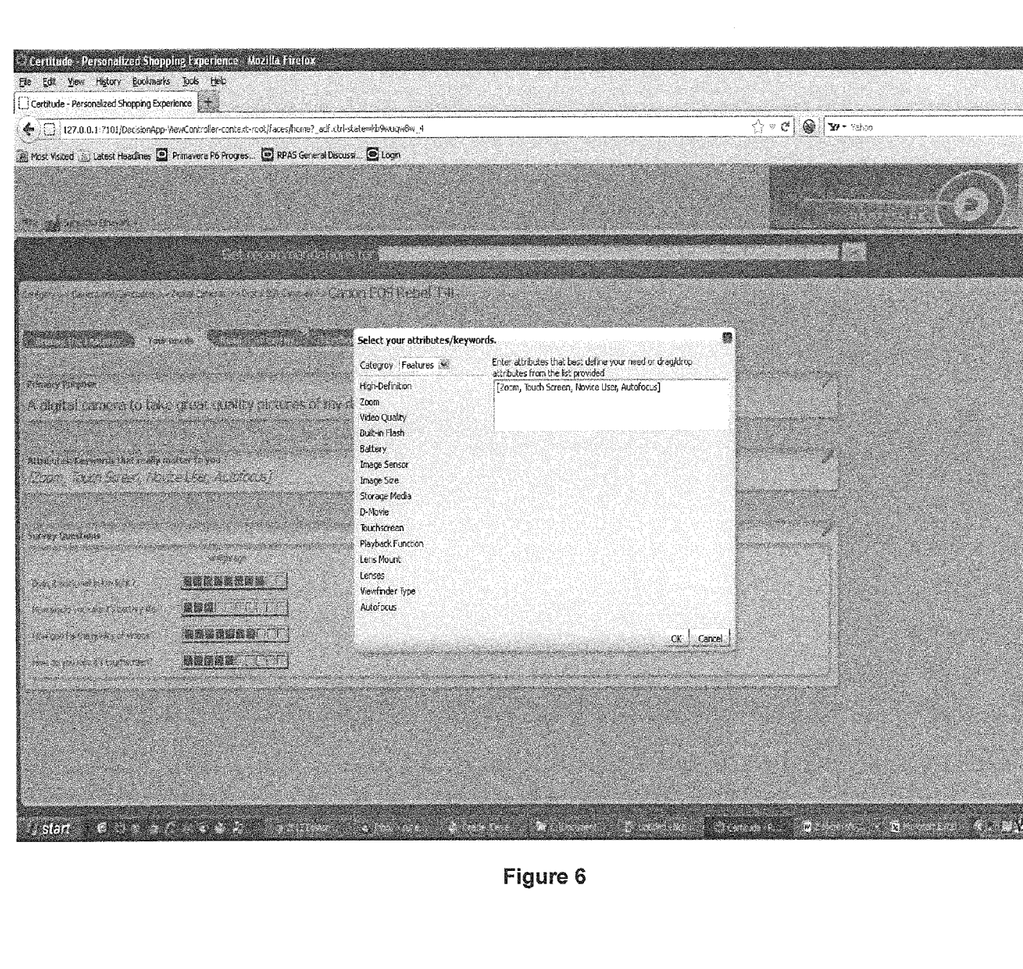
FIG. 6 illustrates example screen shots of one embodiment of a consumer purchase decision scoring tool.

FIG. 5 illustrates example screen shots of one embodiment of a consumer purchase decision scoring tool. This screen interface allows a user to personalize their requirements for the target product. Once the user has selected a target product, the user can indicate the features that are the most important to them by selecting keywords. The keywords are entered into a keyword list FIG. 6 illustrates example screen shots of one embodiment a consumer purchase decision scoring tool. In the screen interfaces shown in FIG. 6, a user is prompted to enter keywords into a consumer purchase decision scoring tool. The keywords selected by the user may be input as text. Alternatively, keywords may be selected from a set of categories. In one example, a category will appear in a shuttle list allowing the user to choose as many or as few of the keywords as desired for a particular category. In this example, the category "Features" includes: high definition, zoom video quality, built in flash, battery . . . and so on. When a keyword is selected from the shuttle list, it is added to the keyword list. The shuttle list may be populated from lists of features on accessed websites.

Figure 7:
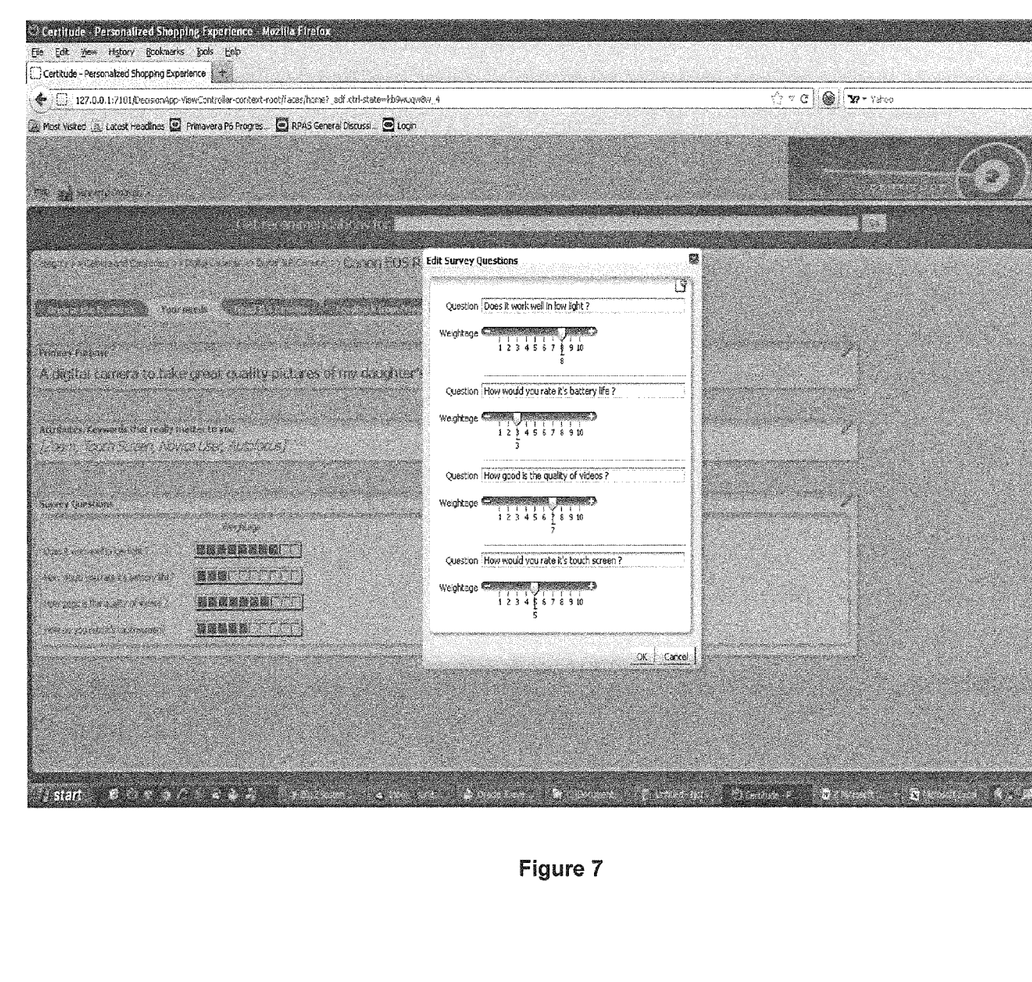
FIG. 7 illustrates example screen shots of one embodiment of a consumer purchase decision scoring tool.

FIG. 7 illustrates example screen shots of one embodiment of a consumer purchase decision scoring tool. In the screen interfaces shown in FIG. 7, a user is prompted to weight survey questions that are either generated by the scoring tool based on the keywords entered in the screens of FIG. 6 or drafted by the user. The survey questions can be assigned weights based on the questions importance to the user. The weight of a survey question may be dependent on the weight of the keyword the survey question is based on. Alternatively the user may set the weight of the survey question by assigning the survey question a value. Values are assigned to survey questions by inputting a numerical value. In the example shown, a numerical value is input by selecting a numerical value on a sliding bar scale.

Figure 8:
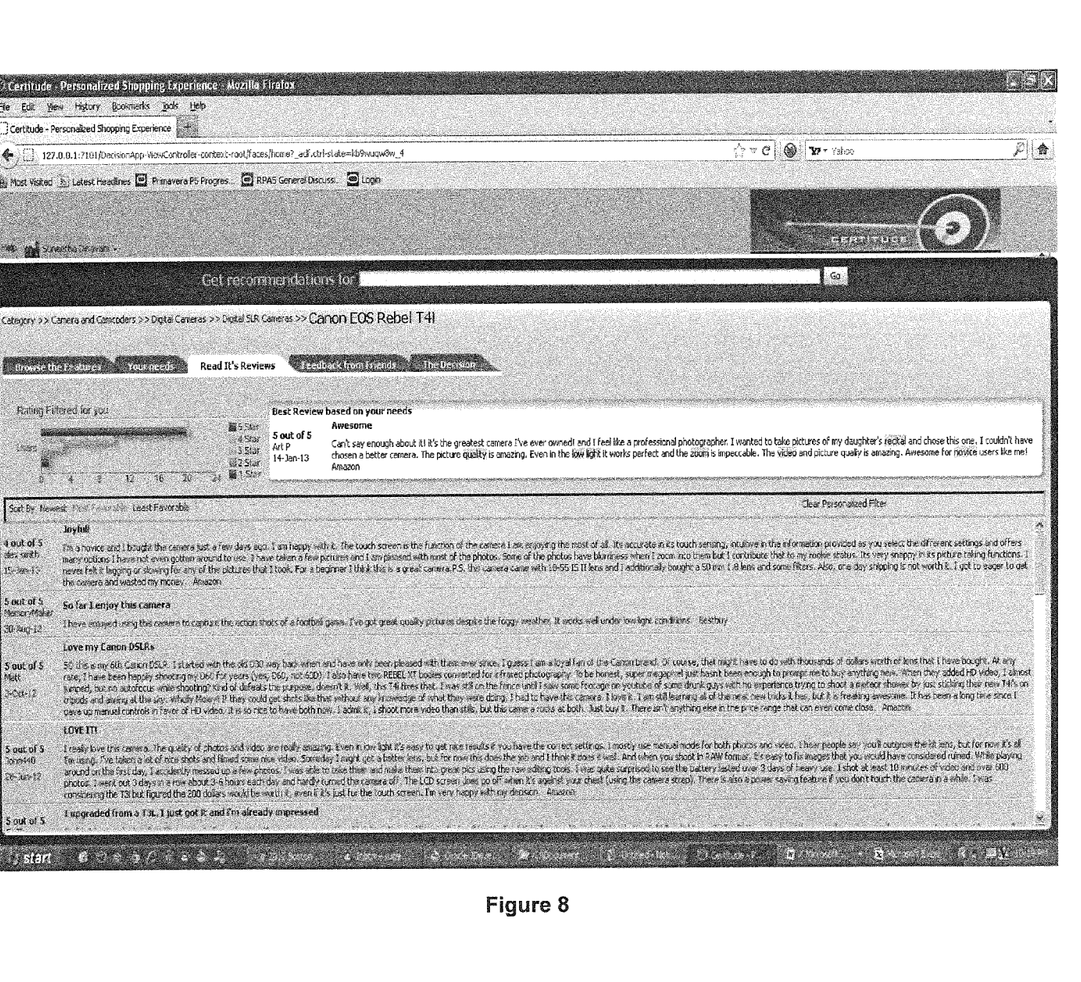
FIG. 8 illustrates example screen shots of one embodiment of a consumer purchase decision scoring tool.

FIG. 8 illustrates example screen shots of a customer review tab for one embodiment of a consumer purchase decision scoring tool. The customer review tab aggregates reviews from external websites using the websites' APIs. The customer reviews are sorted by relevance based on keywords received from the user. For example, the customer reviews may be sorted based on the number of the times that the keywords are used in the customer reviews. Additionally, the customer review tab shows customer review ratings (e.g., number of stars). The customer review ratings may be collectively graphically represented.

Figure 9:
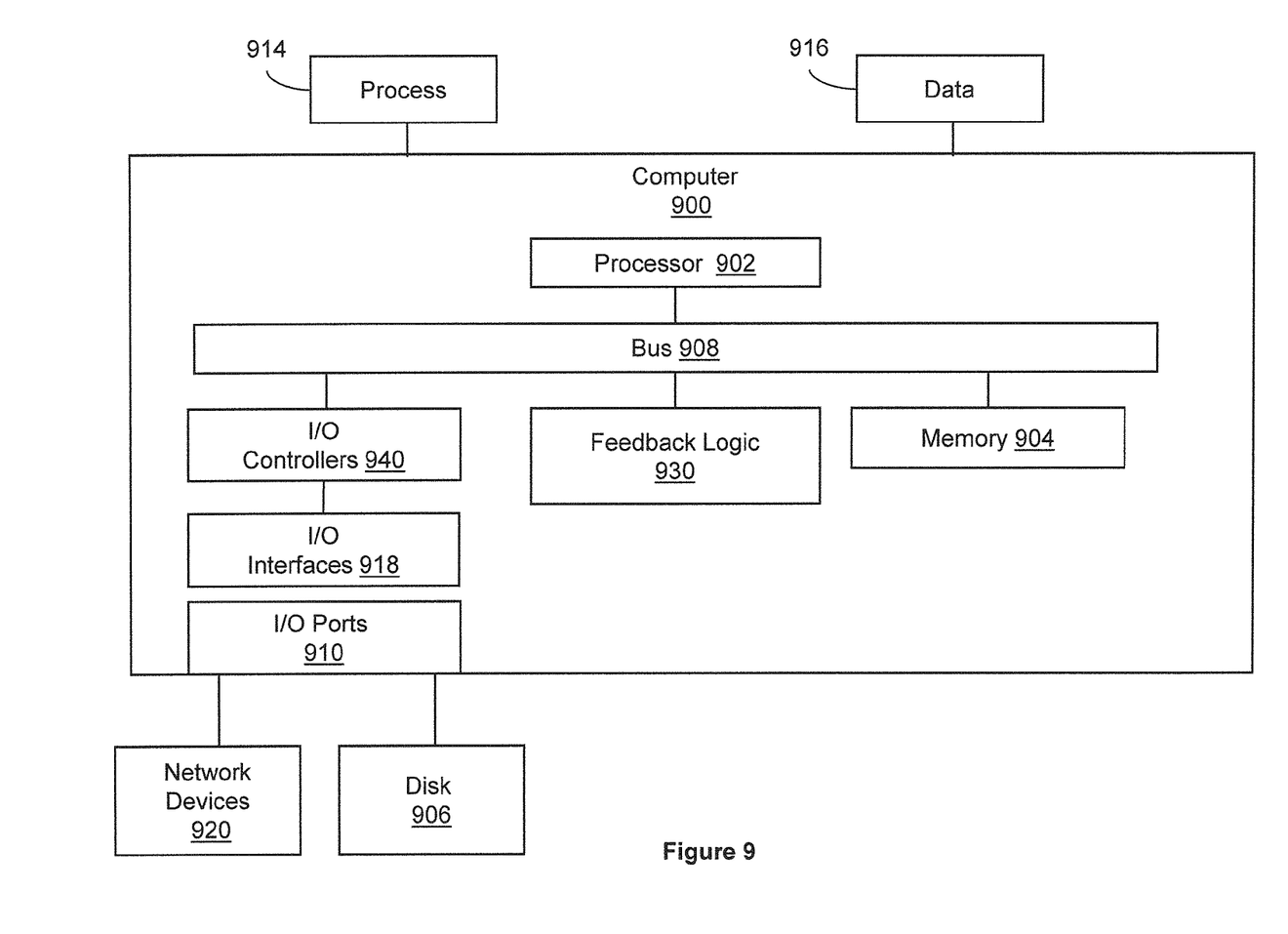
FIG. 9 illustrates an embodiment of a computing system in which example systems and methods, and equivalents, may operate.

FIG. 9 illustrates an example computing device in which example systems and methods described herein, and equivalents, may operate. The example computing device may be a computer 900 that includes a processor 902, a memory 904, and input/output ports 910 operably connected by a bus 908. In one example, the computer 900 may include a consumer purchase decision scoring tool logic 930 configured to aid a user in determining to purchase a target product. In different examples, the consumer purchase decision scoring tool logic 930 may be implemented in hardware, a non-transitory computer-readable medium with stored instructions, firmware, and/or combinations thereof. While the consumer purchase decision scoring tool logic 930 is illustrated as a hardware component attached to the bus 908, it is to be appreciated that in one example, the consumer purchase decision scoring tool logic 930 could be implemented in the processor 902.

In one embodiment, the consumer purchase decision scoring tool logic 930 is a means (e.g., hardware, non-transitory computer-readable medium, firmware) for consumer purchase decision scoring. The means may be implemented, for example, as an ASIC programmed to calculate a buy score. The means may also be implemented as stored computer executable instructions that are presented to computer 900 as data 916 that are temporarily stored in memory 904 and then executed by processor 902.

The consumer purchase decision scoring tool logic 930 provides means (e.g., hardware, non-transitory computer-readable medium that stores executable instructions, firmware) for calculating a buy score based on customer reviews or calculate a buy score based on surveys Alternatively, the consumer purchase decision scoring tool logic 930 may calculate a buy score based on both customer reviews and surveys.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The bus 908 may be a single internal bus interconnect architecture and/or other bus or mesh architectures. While a single bus is illustrated, it is to be appreciated that the computer 900 may communicate with various devices, logics, and peripherals using other busses (e.g., PCIE, 1394, USB, Ethernet). The bus 908 can be types including, for example, a memory bus, a memory controller, a peripheral bus, an external bus, a crossbar switch, and/or a local bus.

The computer 900 may interact with input/output devices via the i/o interfaces 918 and the input/output ports 910.

Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the I/O interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer including a processor cause the computer to:
 execute, by the processor, a scoring tool of a webpage;
 identify, by the processor executing the scoring tool, a
  target product identifier that identifies a target product;

interface, by the processor executing the scoring tool, with an application programming interface (API) of a website to access customer reviews corresponding to the target product identifier and identify rating values from the customer reviews for the target product;

create, by the processor executing the scoring tool, a survey about the target product including questions about the target product and input for responses;

distribute, by the processor executing the scoring tool, the survey to selected social contacts of the user accessed through an API to a social network;

receive, by the processor executing the scoring tool, one or more responses from the selected social contacts to the survey; and calculate, by the processor executing the scoring tool, a buy score for the target product based, at least in part, on the accessed customer reviews, a combination of the rating values, and the one or more responses from the selected social contacts; and render, by the processor executing the scoring tool, a user interface including the buy score and at least a portion of the customer reviews in a prioritized list on a display of the computer.

2. The non-transitory computer-readable medium of claim 1, further comprising instructions that when executed by the processor cause the computer to:

receive and identify, from a computer interface, keywords that identify desired product features of the target product.

3. The non-transitory computer-readable medium of claim 2, further comprising instructions that when executed by the processor cause the computer to:

sort the customer reviews based on the keywords; and
render the sorted customer reviews on the display through the user interface.

4. The non-transitory computer-readable medium of claim 2, further comprising instructions that when executed by the processor cause the computer to:

weight the relevance of the keywords based on a user input; and
order the customer reviews based, at least in part, on a weight of a keyword included in a customer review.

5. The non-transitory computer-readable medium of claim 2, where keywords are selected from categories.

6. The non-transitory computer-readable medium of claim 1, wherein accessing, by the processor via the network communications, the one or more websites the customer reviews are accessed on a remote server using an application programming interface.

7. The non-transitory computer-readable medium of claim 1, wherein the customer reviews are retrieved from multiple sources.

8. The non-transitory computer-readable medium of claim 1, where the surveys are created based, at least in part, on keywords that identify one or more product features of the target product.

9. The non-transitory computer-readable medium of claim 1,
where the customer reviews and the responses from the selected social contacts are assigned a relative weight by the user; and
where calculating the buy score for the target product is based on the weighted customer reviews and the weighted responses from the selected social contacts.

10. The non-transitory computer-readable medium of claim 1, where the selected social contacts are selected from a social networking group.

11. The non-transitory computer-readable medium of claim 1, further comprising instructions that when executed by the processor cause the computer to:

aggregate, by the processor, operational information about the target product from one or more websites;
generate, by the processor, a description of the target product based, at least in part, on the operational information; and
display the description of the target product on the display.

12. A computing system, comprising:
a processor connected to memory; and
a non-transitory computer readable medium configured with instructions that when executed by the processor cause the processor to:
execute a scoring tool of a webpage;
identify, using receiving logic, a target product identifier that identifies a target product;
interface, using feedback logic, with an application programming interface (API) of a website to access customer reviews corresponding to the target product identifier and to identify rating values from the customer reviews
create, using survey logic of the feedback logic, a survey about the target product including questions about the target product and input for responses;
distribute, using survey logic of the feedback logic, the survey to selected social contacts of the user accessed through an API to a social network; and
receive, using survey logic of the feedback logic, responses from the selected social contacts to the survey;
calculate, using score logic, a buy score for the target product based, at least in part, on the customer reviews, a combination of the rating values, and the responses from the selected social contacts to the survey; and
render a user interface including the buy score and at least a portion of the customer reviews in a prioritized list on a display of the computer.

13. The computing system of claim 12,
where the receiving logic is further configured to receive keywords that identify desired product features; and
where the feedback logic is further configured to sort customer reviews based, at least in part, on the keywords.

14. The computing system of claim 13,
wherein the receiving logic is configured to receive a relative weight for the keywords from the user; and
wherein the feedback logic includes instructions that when executed by the processor cause the processor to order the customer reviews in a prioritized order based on the relative weight of a keyword included in a customer review.

15. A computer-implemented method performed by a computing device including at least a processor, the method comprising:
executing, by the processor a scoring tool of a webpage, the executing the score tool including:
identifying, by the processor executing the scoring tool, a target product identifier that identifies a target product;
interfacing, by the processor executing the scoring tool, with an application programming interface (API) of a website to access customer reviews corresponding to the target product identifier and to identify rating values from the customer reviews for the target product;

creating, by the processor executing the scoring tool, a survey about the target product including questions about the target product and input for responses;
distributing, by the processor executing the scoring tool, the survey to selected social contacts of the user accessed through an API to a social network;
receiving, by the processor executing the scoring tool, one or more responses to the survey from the selected social contacts;
calculating, by the processor executing the scoring tool, a buy score for the target product based, at least in part, on the retrieved customer reviews, the one or more responses to the survey from the selected social contacts, and a combination of the rating values; and
rendering, by the processor executing the scoring tool, a user interface including the buy score and at least a portion of the customer reviews in a prioritized list on a display of the computing device.

* * * * *

UNITED STATES PATENT AND TRADEMARK OFFICE
CERTIFICATE OF CORRECTION

PATENT NO. : 9,684,927 B2  
APPLICATION NO. : 13/906412  
DATED : June 20, 2017  
INVENTOR(S) : Itte et al.

Page 1 of 1

It is certified that error appears in the above-identified patent and that said Letters Patent is hereby corrected as shown below:

In the Specification

In Column 4, Line 42, after "website" insert -- . --.

In Column 5, Line 32, after "list" insert -- . --.

Signed and Sealed this  
Fifth Day of June, 2018

Andrei Iancu  
*Director of the United States Patent and Trademark Office*